United States Patent [19]
Potts, Jr.

[11] Patent Number: 6,067,560
[45] Date of Patent: *May 23, 2000

[54] RETRIEVAL SAVING AND PRINTING IN A COMPUTER NETWORK SYSTEM ENVIRONMENT

[75] Inventor: Richard W. Potts, Jr., Poughquag, N.Y.

[73] Assignee: International Business Machines Corporation, Armonk, N.Y.

[ * ] Notice: This patent is subject to a terminal disclaimer.

[21] Appl. No.: 09/078,374

[22] Filed: May 13, 1998

[51] Int. Cl.[7] .................................................. G06F 15/16

[52] U.S. Cl. .......................................... 709/203; 709/229

[58] Field of Search .................................... 709/229, 216, 709/218, 219, 200, 203; 707/10

[56] References Cited

U.S. PATENT DOCUMENTS

| | | | |
|---|---|---|---|
| 5,715,453 | 2/1998 | Stewart | 395/615 |
| 5,721,908 | 2/1998 | Lagarde et al. | 395/610 |
| 5,768,578 | 6/1998 | Kirk et al. | 707/100 |
| 5,953,732 | 9/1999 | Meske, Jr. et al. | 707/513 |
| 6,006,252 | 12/1999 | Wolfe | 709/203 |
| 6,009,459 | 12/1999 | Belfiore et al. | 709/203 |

OTHER PUBLICATIONS

U.S. Patent Application 08/965,359.

*Primary Examiner*—Zarni Maung
*Assistant Examiner*—Yeshi Gebremeskel
*Attorney, Agent, or Firm*—L. Neff

[57] ABSTRACT

An apparatus for retrieving information in a computer network system having at least one network server device and a user device. The user device and said network server having established a successful network session so that they are in processing communication with one another. At first a target page is displayed on a screen or monitor connected to the user device. The target page including a number of first level link references for selection by any user where each first level link reference further includes subsequent level link references. An on-screen search option menu will then be provided to allow any user to search all reference links provided by the target page and all subsequent pages, and to identify only specific references according to the menu selection made. Some of the menu selection provided according to different embodiments of the present invention are media searches, FTP file searches, HREF searches and usernet/newsgroup searches. In some embodiments of the present invention print and save options are also provided as well as depth of search limitations. In another embodiment of present invention, more than one menu selections can be made at one time, resulting in multiple field searches.

18 Claims, 5 Drawing Sheets

RETRIEVAL SAVING AND PRINTING IN A COMPUTER NETWORK SYSTEM ENVIRONMENT

RELATED APPLICATIONS

This application is related to another U.S. application also owned by International Business Machines Corp.; Ser. No. 08/965,359 filed Nov. 6, 1997 still pending.

The present application is being filed on the same day, May 13, 1998 as the following related applications, by Inventor: Richard W. Potts and all assigned to the same assignee as this application, U.S. patent application Ser. Nos. 09/078268, 09/078280, 09/078281, and 09/078382, all pending.

FIELD OF INVENTION

This invention is generally directed to a method of searching and retrieving information in a computer network environment and particularly to a method of printing and saving information from the internet.

BACKGROUND OF THE INVENTION

In recent years, computer systems have evolved into extremely sophisticated devices. The widespread dependance and the proliferation of computers have led to the development of computer networks. Computer networks allow individual PC's as well as large computer systems to communicate with one another independent of their locations. Network interfaces allow computer systems to send and receive data to and from any network the computer system may be connected to. The Internet is one form of a computer network that has become very popular recently, allowing different users and computers to establish communication with one another globally.

Generally, a user accesses the internet through a special software application known as the web browser. A web browser makes a connection through the Internet to other computers systems, sometimes known as the web servers, and receives information from the web servers that is then displayed on the individual user's work-station. Information displayed to the user is typically organized into pages that are constructed using a specialized language called Hypertext Markup language or HTML.

While it is relatively faster to retrieve and display information on individual work-stations, the task of printing or storing the retrieved information remains a challenge. Printing and downloading of retrieved information is often a very slow and painful process, wasting user's time and consuming system's bandwidth. The cumbersome organization of HTML documents is perhaps one of the key contributors to this problem.

Typically, HTML documents provide links to other documents in order to help the user obtain further information if necessary. When a user accesses a certain page of the document on the internet, the target page often provide "links" to other pages which are related in some respect to the target page and/or the subject matter of the target page. These "links" are often referred to as "hyperlinks" and the context in which they are presented is referred to as "hypertext". "Hyperlinks" are defined by a word or words, descriptive of the subject matter of the "linked" page and are usually highlighted in some manner to distinguish them over the rest of the text. Hyperlinks can appear in a bold, underscored fashion and/or even in a different color, to allow the user to easily locate them from an otherwise full page of text. A user can then utilize the keyboard or a pointing device such as a mouse, to activate the desired "hyperlink" by placing the cursor at or pointing the mouse to the desired area and activating the "link" by an entering or clicking action.

When searching a particular subject matter, often the first retrieved page only provides the most basic information in a broad manner but other links are provided to retrieve more detailed information. The next "link" level provides more specialized information about the selected topic with other "links" to provide even more detailed information. In this way each "link" level becomes more specialized and more detail oriented. It is not unusual to have to access several links before obtaining full amount of information necessary about a specific subject matter.

One example is a document that is made up of different sections. The original search retrieves the table of context, with each section provided as a link. In order for the user to download or print the entire document, each section has to be individually selected, downloading them individually one at a time in sequence and sometimes on a page-by-page basis, each time going through the printing protocol and having to return to the table of contents in order to accomplish the printing or downloading task. This can be a painful process, since each time a hyperlink is selected, the entire page will be retrieved including all of the graphics and text and graphics-related parameters specification that is necessary. The retrieval process may take a relatively long time because of the great amount of data and parameters that are needed to specify a color or sound output compared to a textual only display.

In a different situation, where the user wishes to print web pages from a plurality of network sites, the user has to wait until connection to different web sites are established one by one, before searching each time through a proliferation of "links" before initiating the print or store option. (When following a "hyperlink" trail, the user has to travel page-to-page and wait for the page to download from a web server before going through another print protocol.) Even after the print option is enacted, for each selected page, printing protocols has to be reenacted anew, making the process even slower. This disadvantage in retrieval, storage and printing is even more apparent during periods when there are many subscribers using the network at the same time.

As a consequence, a need for an improved methodology exists that can enable a more efficient search and print technique for printing network documentation while requiring a reduced amount of network usage time.

SUMMARY OF THE INVENTION

An apparatus for retrieving information in a computer network system having at least one network server device and a user device. The user device and said network server having established a successful network session so that they are in processing communication with one another. At first a target page is displayed on a screen or monitor connected to the user device. The target page including a number of first level link references for selection by any user where each first level link reference further includes subsequent level link references. An on-screen search option menu will then be provided to allow any user to search all reference links provided by the target page and all subsequent pages, and to identify only specific references according to the menu selection made. Some of the menu selection provided according to different embodiments of the present invention are media searches, FTP file searches, HREF searches and usernet/newsgroup searches. In some embodiments of the present invention print and save options are also provided as well as depth of search limitations. In another embodiment of present invention, more than one menu selections can be made at one time, resulting in multiple field searches.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
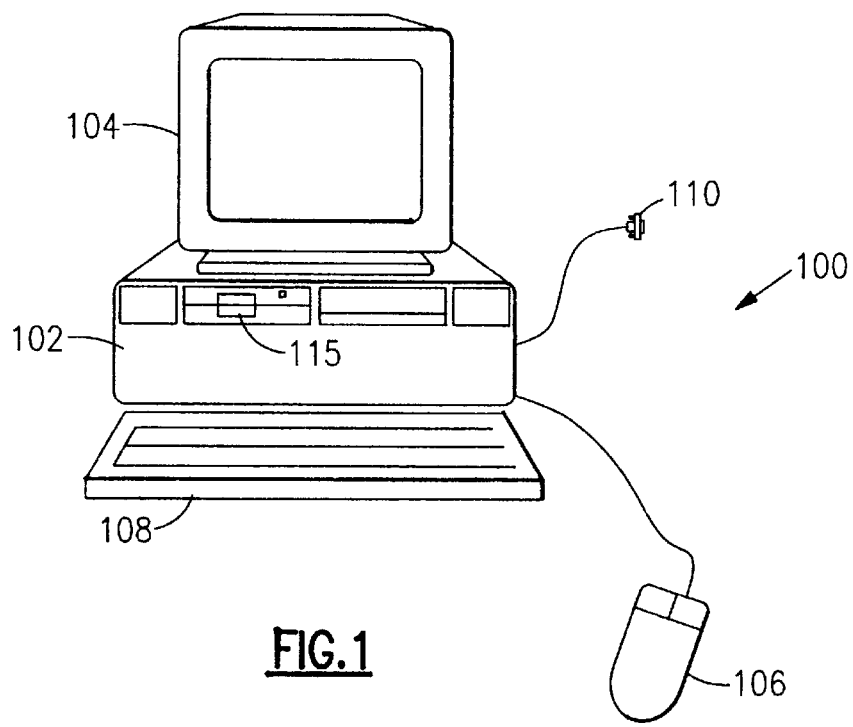
FIG. 1 is a diagram of a computer system in which the present invention may be implemented.

FIG. 1 illustrates a typical computer system shown at 100 as is known to those skilled in the art. The computer system shown in FIG. 1 comprises of a processor unit 102, a display device 104, interface means (such as a mouse shown at 106 and a keyboard shown at 108), a connector 110 for connecting a modem (not shown) within the computer system to a communication line such as a telephone line. The processor unit 102 can further include a floppy drive 115 and hard drive 116 (not shown). The illustration in FIG. 1 is only one example of the many systems available and is only introduced to show a simple and basic set up that the present invention can be implemented on. Replacements, modifications and alterations to this system is possible. For example, a cellular system can be utilized instead of a phone line, in which case the connector element is no longer needed. Other pointing devices can be utilized instead of a mouse or a network of processors or a mainframe computer can be used for processing activity instead of a single processor unit. Other combinations are also possible as known to those skilled in the art. (The present invention may be implemented with all variations of any such computer system.)

Typically when a computer system such as the one shown at 100 is being powered up, an Internet or browser access program gets loaded into the system either automatically or selectively. Furthermore, it is possible for these program to be loaded either partially or completely at a later time if the user desires it. In either case, the access program is needed in running the internet or browser program. The browser is selectively operable to access and execute a site selection program, either directly from a diskette drive unit or directly from a copy of the site selection program stored on the hard drive (both part of the processing unit in the example used here). When the user is actively running a browser program or the like, a series of screens will be displayed to the user on the monitor unit or other display devices. Each screen usually provides a menu with selection options which the user can select via the keyboard or other pointing devices. The user's selection determines the communication link or the path to be taken to access a specific "site" or "webpage".

Figure 2:
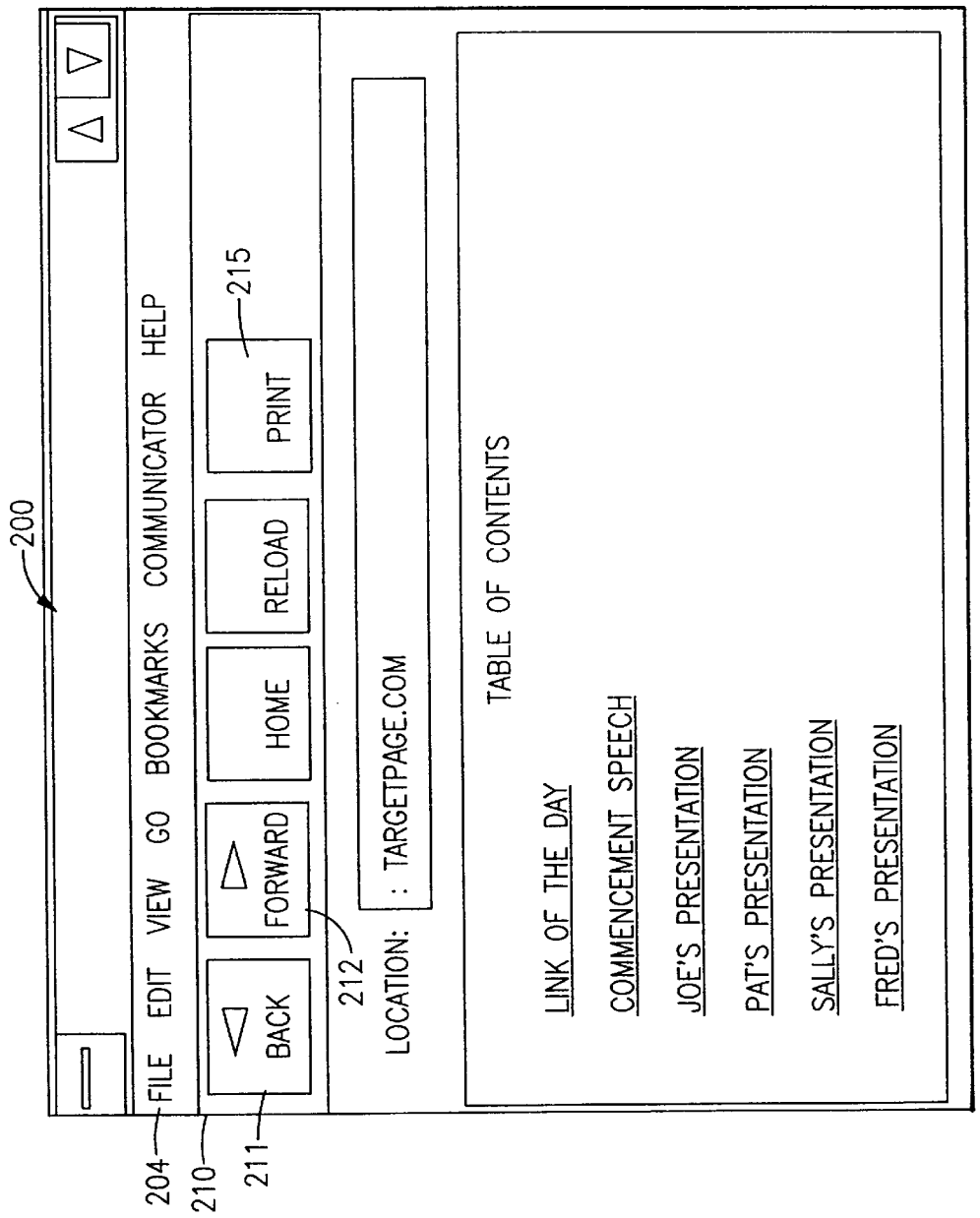
FIG. 2 is an illustration of an exemplary display screen of a webpage showing hyperlink references.

FIG. 2 provides an example of a program screen display 200 in an Internet operating session. The browser screen generally provides a mode row 202 which displays different options or modes such as "File" selection shown at 204. Another row shown at 210 may also be displayed to help a user quickly move through documents or perform other activities. For example, "Back" and "Forward" buttons shown at 211 and 212 allow the user to return to last screen or to go forward to the next screen display and the "Print" option shown at 215 allows the printing of particular pages and documents.

The webpage provided in FIG. 2 is exemplary of a home page. Often the first page or the home page only provides an index which points to other pages and hyperlinks. For example, the list of links provided in this exemplary home page can be re-written in the following manner:

<A href="http://www.xxx.org.yy> Link Of The Day

<A href="/lvg/commencement.html"> Commencement Speech

<A href="presentation1.html"> Joe's Presentation

<A href="presentation2.html"> Pat's Presentation

<A href="presentation3.html"> Sally's Presentation

<A href="presentation4.html"> Fred's Presentation

The list as is provided on the exemplary page illustrates mostly numerous presentations made by different people in a hyperlink format. As mentioned before "hyperlinks" are typically set out in bold type and underscored and/or in different colors for easy recognition. The hyperlinks typically provide a grouping of descriptive words which if selected by a user through the positioning and clicking of a pointer will access the page or site which is designated by the link. The hyperlinks activate an access program to the selected site and allows the user to identify a possible site of interest and "click" on it to access the site from the "current page".

In order to print a particular presentation, as shown in the exemplary webpage, the user would click on the selected hyperlink and the screen would present the selected presentation which could also include additional hypertext and graphics possibilities. The user could then select the "File" mode and the "print" option to print the selected presentation, or go to the second row of options 210 and select the "Print" option.

However, as discussed earlier, the present technology provides inadequate selection when the "Print" option is utilized. The "Print" option usually only prints the current page and disregards other referenced webpages in the hyperlink that may provide necessary information.

The present application provides for some user configurable options. While related application (Ser. No. 08/965, 359) concentrates on assembling a list of all hyperlinks available on a target page for subsequent printing and then printing them down to a selected depth using an asynchronous printing process for all of the selected pages, the present invention takes this concept even further.

Figure 3:
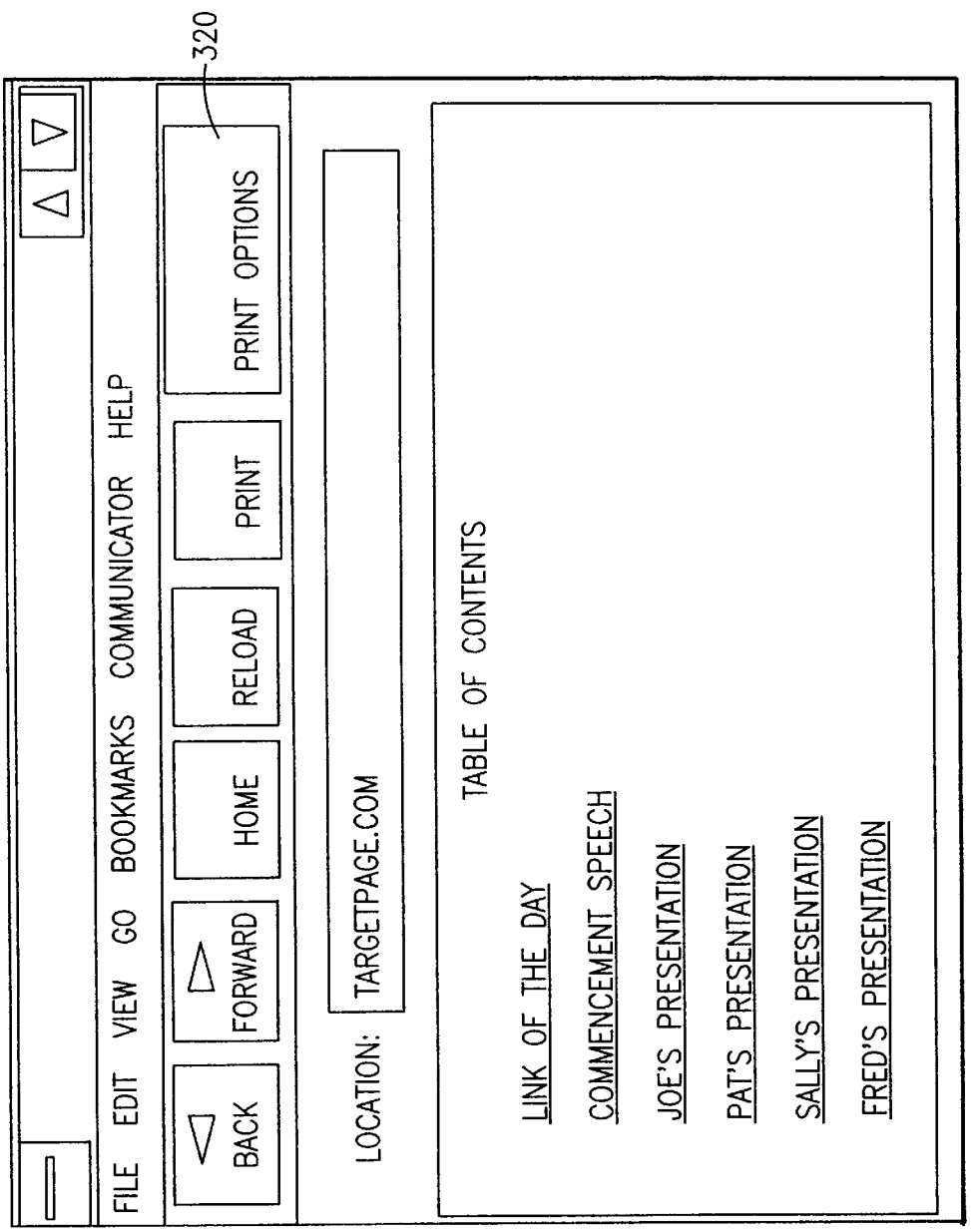
FIG. 3 is an illustration of an exemplary display screen of a webpage showing print selection options according to one embodiment of the present invention.
Figure 4:
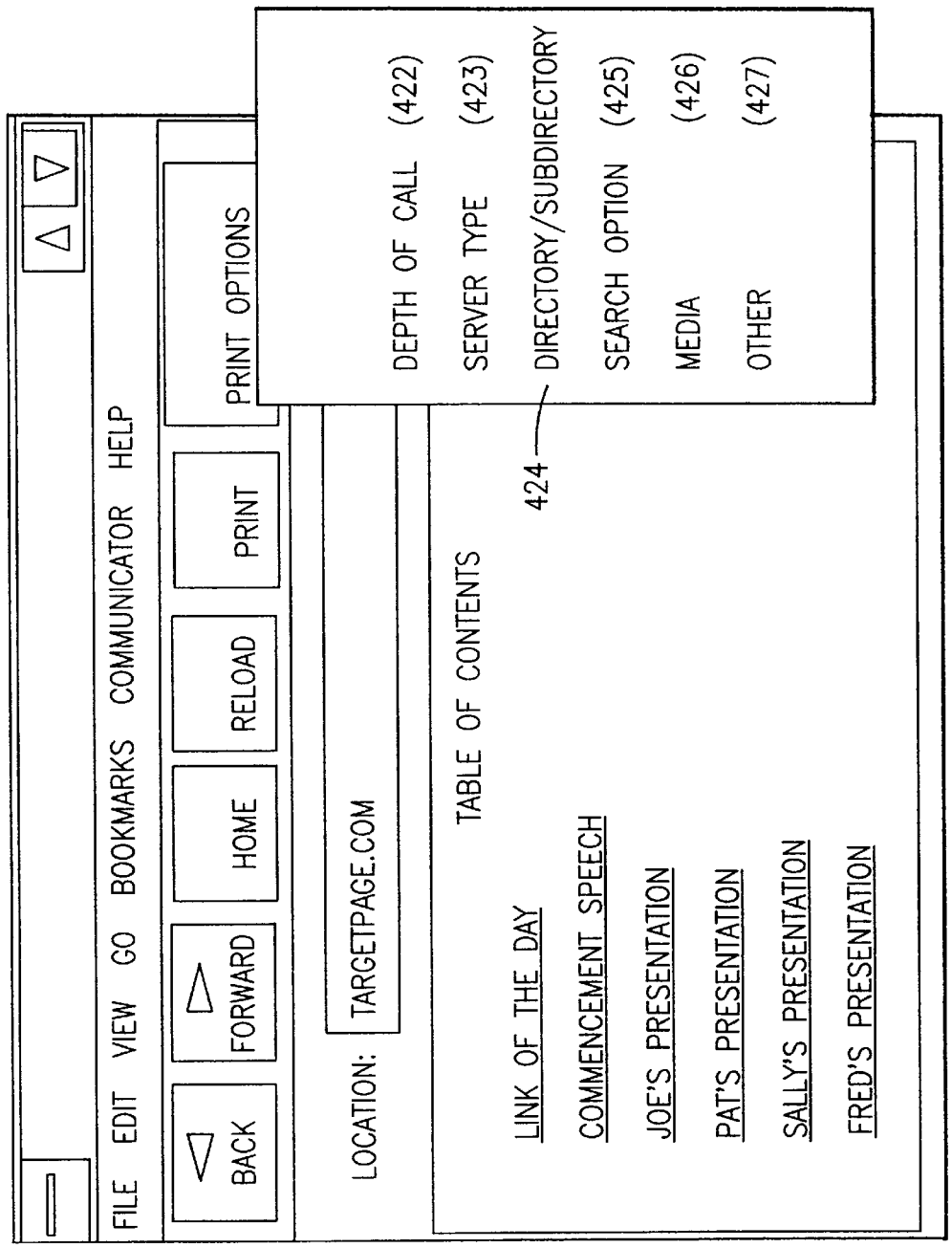
FIG. 4 is an illustration of different print function available to a user as per one embodiment of the present invention.

The present invention provides for an option that will be available to the user either via the mode selection row on screen or selectively at other instances, for example as part of the access program that is being automatically configured, to allow the traversal of links while printing a particular page. If the option is set, or turned on, selecting the "print" option will not only print the target page but also scans other referenced pages for pointer tags. If a menu mode option is provided on screen, as is the case in one embodiment of the present invention and as shown in FIG. 3 at 320, a "Print Option" selection mode is also introduced. Once the "Print Options" is selected, a list of further menu options are provided as shown in FIG. 4, each providing different print selections such as "Depth of call" at 422; "Server type" at 423; "Directory/Sub-Directory" at 424; "Search option" at 425; "Media" at 426; "Other" at 427. Note that the "Print Option" selection menu is only one way of handling this option selection and other methods can equally be utilized.

Figure 5:
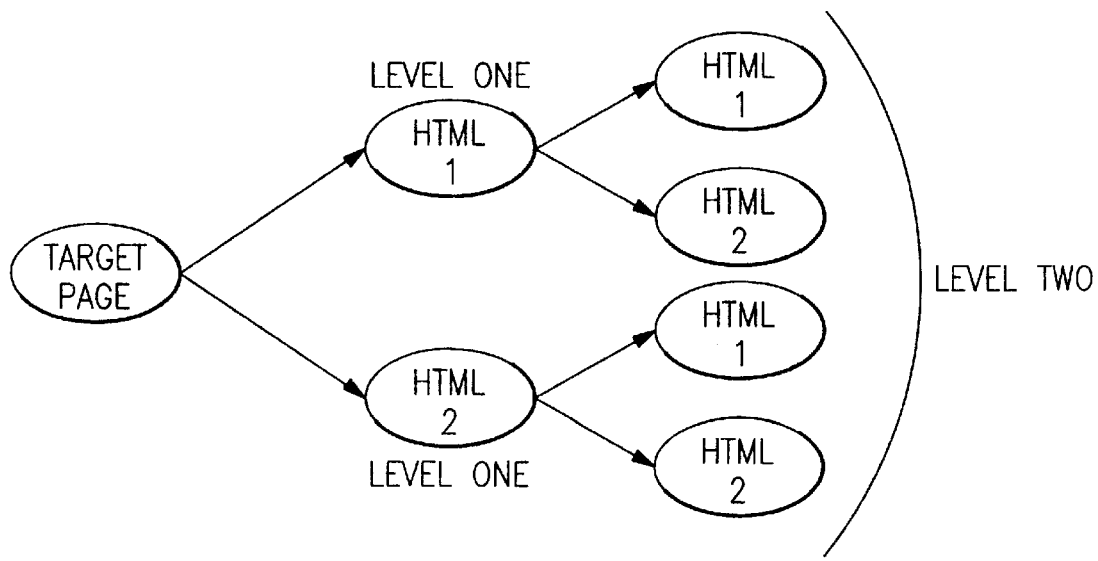
FIG. 5 is a schematic demonstration of hyperlink reference levels.

The "Depth of Call" option selection can be used in several different ways. It can be used by itself, as suggested in related application 08/965,359 to print different depths of link as these links are chased or followed. For example, once the target page is printed and HTML's referenced to in the target page is accessed, other HTML's provided in the target page can also be accessed and printed. Each Printing job provides a different level as shown in FIG. 5, with target page being identified as target page or level 0 and each subsequent HTML pages constituting levels 1 through n. In the above embodiment where pointers are used, once a link or level is chased, the "pointers" could point to additional HTMLs that could also contain <href=> tags. This process would then be repeated to find secondary pages and other additional pages as per user specification in the "Print Option" selection menu.

"Depth of Call" option, however can also be utilized in conjunction with other option selection. As described below, Depth of Call can be combined with other options to put limits on the searching, storing and printing, especially since a large "Depth of Call" value by itself can quickly lead to exhaustive results.

When the "Print option" menu is available and selected, the user can identify a series of different print options. When the user chooses "Server Type" option, the user is selecting to only follow and print links on a specific server, the default being the current server in this embodiment. This concept is better understood by using the following example.

<A href="http://www.xxx.org.yy> Link Of The Day

<A href="http://www.ACompany.com/packet1"> A's CO.—packet 1

<A href="http://www.XCompany.com/pres"> X's CO.—presentation

<A href="http://www.ACompany.com/packet2"> A's Co.—packet 2

<A href="http://www.NCompany.com/pres"> M's Co.—presentation

In this example the original server, or the default server, is defined as "www.ACompany.com". Therefore when the server option selection is made, any links identified by "www.ACompany.com" will be retrieved and ultimately printed. In the above example the "A's Co.—packet 1" and "A's Co.—packet 2" identified respectively by: <A href="http://www.ACompany.com/ packet1"> and <A href="http://www.ACompany.com/packet2"> are the only two that would be printed. Further links provided in packet 1 and packet 2 pages that contain the original server will also be printed if the user had chosen a greater depth. As described above, if the "Depth of Call" option is selected in conjunction with the "Server" option, a desired depth of links can be printed relating to a particular server.

The user could have easily by-passed the default server and specified any other servers. Once the "Server Option" is selected, further menu options can be provided on-screen to allow the user choose other server options or view and select the default server. In the above example, if the user had chosen "www.NCompany.com" server, the N company's presentation would be selected instead, and a "Depth of Call" value larger than one would have printed the HTML references presented in the N company's presentation page as well. It is also possible to define or specify more than one server or to exclude one or more servers from the search. These different options can also be provided as part of the server option menu.

Another search option is the "Directory/SUB-DIRECTORY" function which could limit search, store and printing options to a specific directory or subdirectory. The current directory/sub-directory can be set as the default option, with a possibility of changing the default options. In addition the user can select other directory/sub-directory(s) to be searched. For example when viewing "www.xyz.com/lvg/speech.html", a link to <A href="/lvg/part1.html" would be followed because the link is on the same server and on the same directory. Similarly, a link to <A href="/lvg/history/article.html" would also be followed because this reference is placed in a subdirectory on /lvg on www.xyz.com. By contrast a link to <A href="/rwp/history/article.html"> would not be followed even if the site is part of www.xyz.com, because it is placed in a different subdirectory. Again this option can be combined with "Depth of Call" option.

As before more than one directory/sub-directory may be specified. In one embodiment, another on-screen menu can "pop-up" once the "Directory/Sub-directory" option is selected to allow the user specify one or more directories/sub-directories, view the default functions or alter them, and exclude one or more directory/sub-directories.

The "Search" option provides for the user input of a string or word. The referenced HTML pages are then searched and printed only if they contain the particularly specified word or string. An "Exclude" option can also be provided that will print all HTML's referenced as long as they do not provide a certain string or word. As before the "Depth of Call" option can be combined to give more or less search depths while performing the search and printing and storing it.

The Media option provides for the selection of music, video and/or audio files which are often identified by suffixes such as : ".qt", ".mid", ".au", ".jmpg" or the like. The user can specify to include or exclude any such files. If the user has decided to include these files, the files will not be printed, but instead they will be saved to the user's hard disk or floppy drive, as specified by the user, for future reference and viewing/playing. This is especially useful because often these files are big and retrieving them over a phone line takes a long time. It may be nice, for example, to allow the user to be able to pull such files overnight, especially when many links are involved, and then be able to view/play them at the user's convenience without having to wait for them to be retrieved/downloaded.

In an alternate embodiment, an option similar to the "Media" option can be provided for "Bitmap" files. Since it takes a long time to print bitmap files, the user can select to either save these on a drive/disk or completely forgo them. As an extension to this option, the user can completely forgo printing the graphics provided in each search if desired. The "Media" option can be used alone or in conjunction with other options provided.

The "Other" option can be used for providing other miscellaneous searches. For example an option can be provided for HREF tags so that <A HREF=

"mailto:User@Us.XYZ.com"> when selected will create and send an internet e-mail to User at the user's address.

Figure 6:
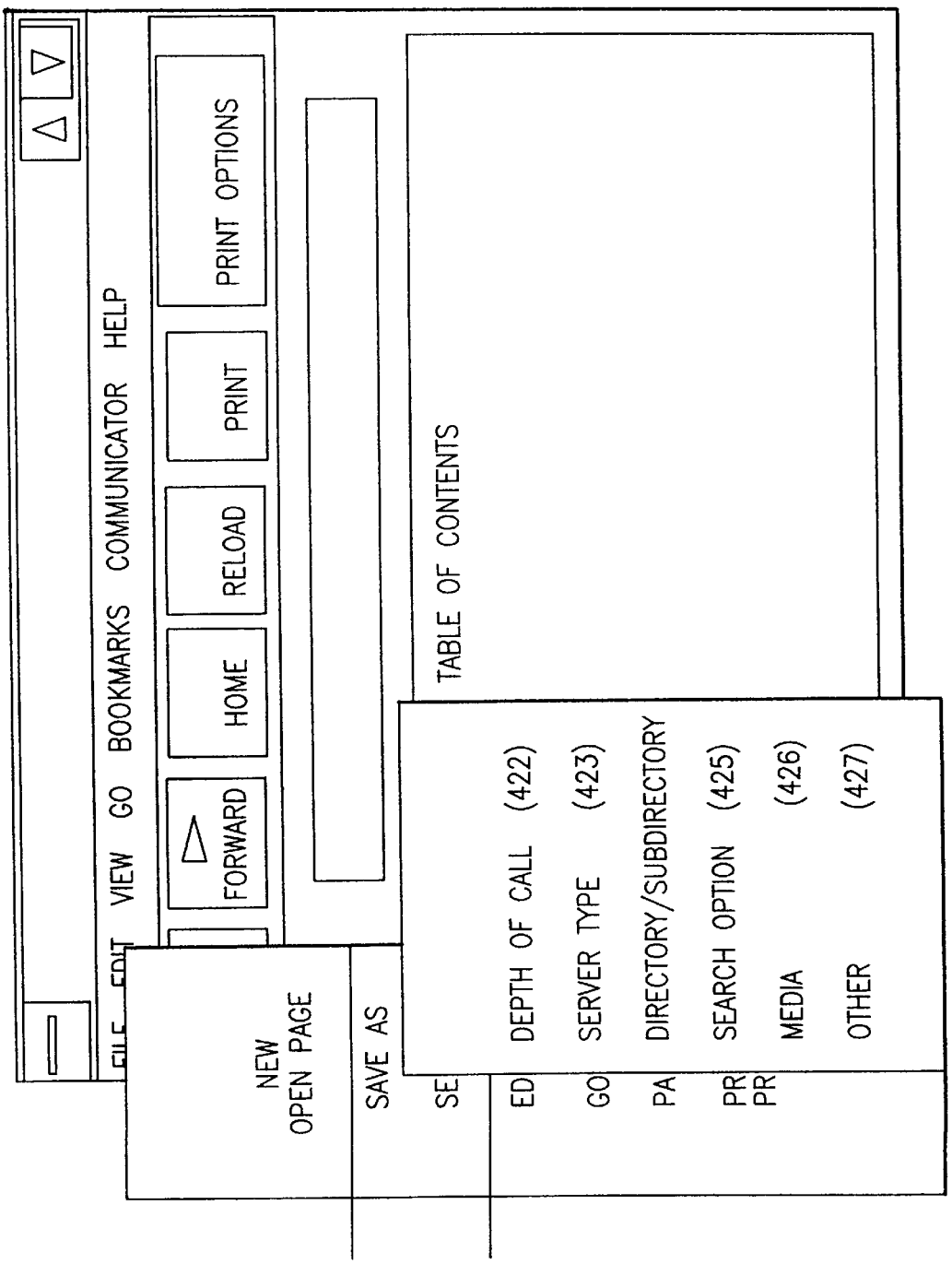
FIG. 6 is an illustration of different save functions available for user selection as per one embodiment of the present invention.

Another option can also be provided that instead of printing the selected pages, the pages will be saved to the user hard disk/floppy drive as per user's selection. In an alternate embodiment a separate option row is provided after the user selects "File" and then "Save" that contains all of the options provided in FIG. 4. One embodiment is shown in FIG. 6.

Another miscellaneous option that can be provided is an FTP option. Under this option any link pointing to a file that could be retrieved using FTP is identified such as <A HREF="ftp://fwux.fedworld.gov/pub". FTP or "File Transfer Protocol" is usually used for retrieving files. In most cases, it defaults to transferring the file when selected, rather than trying to view or open it. The FTP files and links are useful to be downloaded and saved in order to provide time efficiency.

It may also be useful to identify and print/save Usenet and Newsgroup information such as <A HREF="news: misc.book.technical"> which provides a link to the misc.book.technical group.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

Having thus described my invention, what I claim as new and desire to secure by Letters Patent is:

1. An apparatus for retrieving information in a computer network system having at least one network server device and a user device, said user device and said network server having established a successful network session so that they are in processing communication with one another; said apparatus comprising:

a monitor for displaying a target page on a screen connected to said user device, said target page including a plurality of first level link references for selection by any user where each first level link reference further includes subsequent level link references;

an on-screen search option menu to allow searching and identifying of all reference links provided by said target page and all subsequent pages as per menu selection made.

2. The apparatus of claim 1, wherein said computer network is an internet and said network server devices are web server devices.

3. The apparatus of claim 2, wherein said level link references are hyperlink references.

4. The apparatus of claim 3, wherein said menu selection provides for searching and storing of any and all HREF tags.

5. The apparatus of claim 4, wherein said menu selection also provides for creation of an internet e-mail to a user at a user's address according to said HREF tag.

6. The apparatus of claim 1, wherein said user inputs directory selection via an interface device electronically connected to said user device.

7. The apparatus of claim 1, further comprising means for providing a depth of call option wherein any user is provided an option of limiting said search and storing of references to a specified level of link references.

8. The apparatus of claim 1, wherein said menu selection provides for selection of media files.

9. The apparatus of claim 8, wherein said media file is an audio file.

10. The apparatus of claim 8, wherein said media file is a video file.

11. The apparatus of claim 8, wherein said media file is a bitmap file.

12. The apparatus of claim 8, further comprising the step of storing said search result in a memory location.

13. The apparatus of claim 8, further comprising the step of saving said search information to a medium.

14. The apparatus of claim 1, wherein said menu selection provides for FTP files.

15. The apparatus of claim 1, wherein said menu selection provides for searching and storing of any and all usernet and newsgroup information.

16. The apparatus of claim 15, wherein said stored information can be printed at user's request.

17. The apparatus of claim 1, wherein said menu selection provides for searching and storing of any and all HREF tags.

18. The apparatus of claim 1, wherein multiple menu selections can be made at one time, allowing multiple field searches.

* * * * *